(12) United States Patent
Suzuki

(10) Patent No.: US 8,711,112 B2
(45) Date of Patent: Apr. 29, 2014

(54) ELECTRONIC DEVICE AND RECORDING MEDIUM

(75) Inventor: Maho Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 453 days.

(21) Appl. No.: 12/902,385

(22) Filed: Oct. 12, 2010

(65) Prior Publication Data

US 2011/0248937 A1 Oct. 13, 2011

(30) Foreign Application Priority Data

Oct. 14, 2009 (JP) .................................. 2009-237083

(51) Int. Cl.
*G06F 3/041* (2006.01)

(52) U.S. Cl.
USPC ........................................................ 345/173

(58) Field of Classification Search
USPC ............. 345/156, 173–181; 324/678; 702/69; 178/18–20
See application file for complete search history.

(56) References Cited

U.S. PATENT DOCUMENTS

| | | | | |
|---|---|---|---|---|
| 5,565,658 | A * | 10/1996 | Gerpheide et al. | 178/18.02 |
| 5,793,303 | A * | 8/1998 | Koga | 340/7.56 |
| 6,124,848 | A * | 9/2000 | Ballare et al. | 345/179 |
| 8,040,142 | B1 * | 10/2011 | Bokma et al. | 324/658 |
| 2004/0171349 | A1 * | 9/2004 | Sakaguchi | 455/63.1 |
| 2008/0165157 | A1 * | 7/2008 | Fu et al. | 345/174 |
| 2009/0002343 | A1 * | 1/2009 | Land et al. | 345/178 |

FOREIGN PATENT DOCUMENTS

| | | |
|---|---|---|
| JP | 6-12510 | 2/1994 |
| JP | 07-334290 | 12/1995 |
| JP | 09-101862 | 4/1997 |
| JP | 2007-072798 | 3/2007 |
| JP | 2009-118043 | 5/2009 |
| WO | 2008085720 | 7/2008 |

OTHER PUBLICATIONS

JP Office Action dated May 28, 2013, with partial English translation; Application No. 2009-237083.

* cited by examiner

*Primary Examiner* — Srilakshmi K Kumar
*Assistant Examiner* — Damon Treitler
(74) *Attorney, Agent, or Firm* — Young & Thompson

(57) ABSTRACT

A mobile communication terminal 100 has a touch panel unit 150 as an input unit. Touch detection is performed by scanning detection signals from the touch panel unit 150 at a given operation frequency. A radio device 120 performs communication such as cellular communication and reception of broadcast such as digital broadcast. When the radio device 120 performs radio transmission/reception operation, a touch detection processing unit 112 identifies an operation frequency of the touch panel unit 150 that is not interfered by the frequency of radio transmission/reception by the radio device 120 and a touch panel control unit 111 controls the touch panel unit 150 to scan it at that operation frequency.

9 Claims, 7 Drawing Sheets

FIG. 5A

COMMUNICATION FREQUENCY
CORRESPONDENCE TABLE

| COMMUNICATION MODE | BAND CLASS | OPTIMUM TOUCH DETECTION FREQUENCY | ... |
|---|---|---|---|
| DOMESTIC | BAND A | ft1 (DEFAULT) | ... |
| DOMESTIC | BAND B | ft1 (DEFAULT) | ... |
| DOMESTIC | BAND C | ft2 | ... |
| OVERSEA | | ft3 | ... |
| ⋮ | ⋮ | ⋮ | ⋮ |

FIG. 5B

BROADCAST FREQUENCY
CORRESPONDENCE TABLE

| RECEPTION CHANNEL | OPTIMUM TOUCH DETECTION FREQUENCY | ... |
|---|---|---|
| ⋮ | ⋮ | ⋮ |
| 15ch | ft1 (DEFAULT) | ... |
| 16ch | ft1 (DEFAULT) | ... |
| ⋮ | ⋮ | ⋮ |
| 30ch | ft2 | ... |
| 31ch | ft3 | ... |
| ⋮ | ⋮ | ⋮ |

FIG. 7A

COMMUNICATION FREQUENCY
CORRESPONDENCE TABLE

| COMMUNICATION MODE | BAND CLASS | DISPLAY FREQUENCY | OPTIMUM TOUCH DETECTION FREQUENCY | ... |
|---|---|---|---|---|
| DOMESTIC | BAND A | fd1 (DEFAULT) | ft1 (DEFAULT) | ... |
| | BAND B | fd1 (DEFAULT) | ft1 (DEFAULT) | ... |
| | BAND C | fd2 | ft2 | ... |
| OVERSEA | | fd1 (DEFAULT) | ft3 | ... |
| ⋮ | ⋮ | ⋮ | ⋮ | ⋮ |

FIG. 7B

BROADCAST FREQUENCY
CORRESPONDENCE TABLE

| RECEPTION CHANNEL | DISPLAY FREQUENCY | OPTIMUM TOUCH DETECTION FREQUENCY | ... |
|---|---|---|---|
| ⋮ | ⋮ | ⋮ | ⋮ |
| 15ch | fd1 (DEFAULT) | ft1 (DEFAULT) | ... |
| 16ch | fd1 (DEFAULT) | ft1 (DEFAULT) | ... |
| ⋮ | ⋮ | ⋮ | ⋮ |
| 30ch | fd2 | ft2 | ... |
| 31ch | fd1 (DEFAULT) | ft3 | ... |
| ⋮ | ⋮ | ⋮ | ⋮ |

FIG. 7C

DISPLAY FREQUENCY
CORRESPONDENCE TABLE

| DISPLAY FREQUENCY | OPTIMUM TOUCH DETECTION FREQUENCY | ... |
|---|---|---|
| fd1 (DEFAULT) | ft1 (DEFAULT) | ... |
| fd2 | ft2 | ... |
| fd3 | ft3 | ... |
| ⋮ | ⋮ | ⋮ |

ELECTRONIC DEVICE AND RECORDING MEDIUM

INCORPORATION BY REFERENCE

This application is based on Japanese Patent Application No. 2009-237083 filed on Oct. 14, 2009 and including specification, claims, drawings and summary. The disclosure of the above Japanese Patent Application is incorporated herein by reference in its entirety.

TECHNICAL FIELD

The present invention relates to an electronic device and recording medium and particularly to an electronic device suitable for touch panel input and a recording medium.

BACKGROUND ART

It has become common in electronic devices having a display screen such as mobile communication terminals (cellular phones) that the display unit be configured with a touch panel and the user touches the screen for input. The touch panel allows for a more intuitive input operation and provides a useful input method particularly to mobile communication terminals having smaller keys.

Mobile communication terminals have become multifunctional and carry multiple types of radio devices. More specifically, they generally carry not only radio devices for voice telephone calls and data communication, which are the main functions of mobile communication devices, but also multiple radio devices for reception of one segment broadcast and radio communication with Bluetooth (registered trademark) and wireless LAN.

These radio devices are used by switching the reception or communication frequency. The operation frequency varies depending on the frequency used and may interfere with the touch panel drive frequency. In such a case, the detection of touch to the touch panel is influenced and the touching may not be detected properly, forcing the user to retry.

Touch panel detection errors occur often due to the influence of the above external factors. Techniques for reducing detection errors, for example, by taking into account environmental change such as temperature change (for example, Patent Literature 1) or by changing detection conditions depending on whether the back light is ON or OFF (for example, Patent Literature 2) have been proposed.

CITATION LIST

Patent Literature

[Patent Literature 1] Examined Japanese Patent Application KOKOKU Publication No. H6-12510; and
[Patent Literature 2] Unexamined Japanese Patent Application KOKAI Publication No. 2007-72798.

SUMMARY

However, there is no technique for reducing touch panel detection errors based on the above-described cause-and-effect relationship with the radio device operation frequency.

The present invention is made in view of the above circumstances and an exemplary object of the present invention is to more efficiently reduce touch panel detection errors.

In order to achieve the above objective, the electronic device according to a first exemplary aspect of the present invention is an electronic device including a radio device and a touch panel, wherein the electronic device includes:

a radio frequency identifying unit identifying the frequency used by the radio device;

an operation frequency identifying unit identifying an operation frequency of the touch panel that does not interfere with at least the radio frequency identified by the radio frequency identifying pert; and a touch panel drive unit driving the touch panel at the operation frequency identified by the operation frequency identifying unit.

The above electronic device may further include:

a display unit of which the display frequency can be switched;

a display frequency identifying unit indentifying a display frequency of the display unit that does not interfere with the radio frequency identified by the radio frequency identifying unit; and a display control unit switching to the display frequency identified by the display frequency identifying unit and operating the display unit, and in such a case, desirably, the operation frequency identifying unit identifies the operation frequency that does not interfere with the display frequency identified by the display frequency identifying unit.

The above electronic device may further include:

an interference determination unit determining whether or not the radio frequency identified by the radio frequency identifying unit interferes with the operation frequency of the touch panel, and in such a case, the operation frequency identifying unit identifies an operation frequency of the touch panel that does not interfere with the radio frequency when the interference determination unit affirms interference.

The above electronic device may further include:

an interference determination unit determining whether or not the display frequency identified by the display frequency identifying unit interferes with the operation frequency of the touch panel, and in such a case, the operation frequency identifying unit identifies an operation frequency of the touch panel that does not interfere with the display frequency when the interference determination unit affirms interference.

The above electronic device may further include:

a correspondence information memory storing correspondence information associating radio frequency information indicating multiple radio frequencies with operation frequency information indicating the operation frequencies that do not interfere with the radio frequencies indicated by the radio frequency information, and in such a case, the operation frequency identifying unit identifies the operation frequency based on the correspondence information.

In such a case, the correspondence information memory may store correspondence information that associates display frequency information indicating multiple display frequencies with the radio frequency information and/or the operation frequency information.

In the above electronic device, the operation frequency identifying unit may identify the operation frequency that is an integral multiple of the radio frequency identified by the radio frequency identifying unit and does not interfere with the radio frequency.

Desirably, the above electronic device further includes:

an error determination unit determining whether a touch detection error occurs when the touch panel drive unit drives the touch panel at an operation frequency identified by the operation frequency identification unit; and an error processing unit processing errors when the error determination unit determines that a touch detection error has occurred.

In such a case, desirably:

the radio device performs multiple types of radio transmission/reception, and the error processing unit performs different error procedures depending upon the type of radio transmission/reception performed by the radio device.

In order to achieve the above objective, the computer-readable recording medium in which programs are recoded according to a second exemplary aspect of the present invention stores programs that allow a computer controlling an electronic device including a radio device and a touch panel to realize the following functions:

identifying the frequency used by the radio device;

identifying the operation frequency of a touch panel that does not interfere with at least the identified radio frequency; and driving the touch panel at the identified operation frequency.

The present invention can more effectively reduce touch panel detection errors.

BRIEF DESCRIPTION OF THE DRAWINGS

These objectives and other objectives and advantages of the present invention will become more apparent upon reading of the following detailed description and the accompanying drawings in which:

FIGS. 5A and 5B are frequency correspondence tables used in the "touch input process (2)" shown in FIG. 4: FIG. 5A shows a communication frequency correspondence table and FIG. 5B shows a broadcast frequency correspondence table;

FIGS. 7A to 7C are frequency correspondence tables used in the "touch input process (3)" shown in FIG. 6: FIG. 7A shows a communication frequency correspondence table, FIG. 7B shows a broadcast frequency correspondence table, and FIG. 7C shows a display frequency correspondence table.

EXEMPLARY EMBODIMENT

An embodiment of the present invention is described hereafter with reference to the drawings. In the embodiment, the present invention is applied to a mobile communication terminal.

Figure 1:
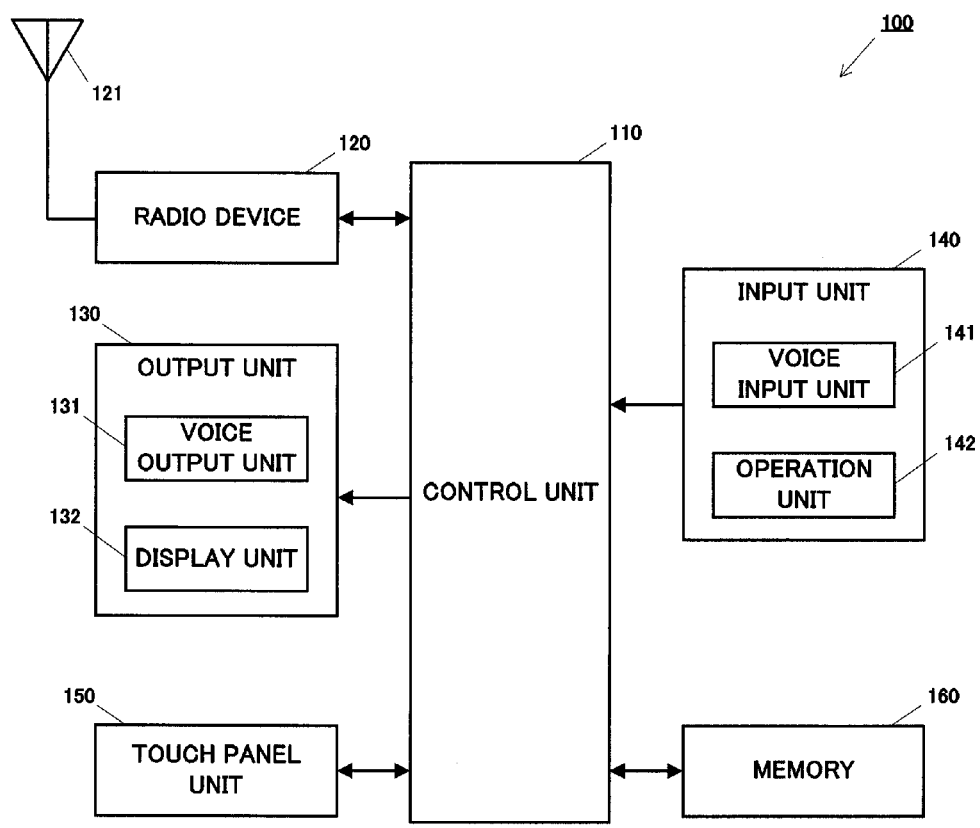
FIG. 1 is a block diagram showing the configuration of a mobile communication terminal according to an embodiment of the present invention.

The configuration of a mobile communication terminal 100 of this embodiment is described with reference to FIG. 1. FIG. 1 is a block diagram showing the configuration of a mobile communication terminal 100. As shown in the figure, the mobile communication terminal 100 are composed of a control unit 110, a radio device 120, an output unit 130, an input unit 140, a touch panel unit 150, a memory 160, and so on.

The control unit 110 is composed of arithmetic processing circuits including a CPU (central processing unit), a RAM (random access memory) as a work area, and various drivers. The control unit 110 controls the units of the mobile communication terminal 100 and executes the procedures, which will be described later, based on given operation programs stored in the memory 160. The components of the mobile communication terminal 100, which will be described later, are each connected to the control unit 110. Data exchange between the components is conducted via the control unit 110.

The radio device 120 conducts operations regarding radio transmission/reception functions installed in the mobile communication terminal 100. The radio device 120 includes at least a component necessary for basic functions of the mobile communication terminal 100 such as voice telephone calls and data communication (a so-called cellular communication module). Here, the mobile communication terminal 100 of this embodiment has, in addition to cellular communication, a radio transmission/reception function(s) of a (types) different from cellular communication. The radio device 120 includes one or multiple types of radio devices corresponding to radio transmission/reception functions. In this embodiment, the radio device 120 includes, for example, modules for receiving digital broadcast such as one segment broadcast (broadcast reception modules). An antenna 121 corresponding to each radio module is used for radio transmission/reception.

The output unit 130 is composed of a voice output unit 131, a display unit 132, and so on and conducts output operation of various information from the mobile communication terminal 100.

The voice output unit 131 is composed of, for example, a speaker and outputs a ringtone and received voice upon telephone calls.

The display unit 132 is composed of, for example, a liquid crystal display and displays various screens regarding the functions of the mobile communication terminal 100.

The input unit 140 is composed of a voice input unit 141, an operation unit 142, and so on and functions as an interface for the user input to the mobile communication terminal 100.

The voice input unit 141 is composed of, for example, a microphone and used to input the user's speech upon telephone calls.

The operation unit 142 is composed of a keypad (character keys (numeric keys), arrow keys, and so on) and function buttons provided on the enclosure of the mobile communication terminal 100 and generates input signals according to the user operation for input to the control unit 110.

The input unit of this embodiment includes, in addition to the operation unit 142, the touch panel unit 150 configured in the display unit 132 to detect finger touch to the display screen of the display unit 132 for input operation.

The touch panel unit 150 of this embodiment includes a touch sensor composed of a transparent electrode film made of, for example, ITO (indium tin oxide) and forming a matrix of electrodes on the display screen of the display unit 132, and generates detection signals according to the finger touch to the touch sensor. In this embodiment, the touch panel is of a capacitance type and, in this case, a touch sensor changing capacitance according to the finger touch is configured.

The memory 160 is composed of a given memory unit such as a ROM (read only memory) and flash memory and stores operation programs (applications) executed by the control unit 110, and data necessary for executing various procedures and data generated through execution of the procedures.

The operation programs stored in the memory 160 include any basic programs taking charge of basic operations of the mobile communication terminal 100 (namely OS (operating system)) and operation programs for realizing various procedures (application programs), which will be described later. The procedures of the mobile communication terminal 100 that are described later are realized by the control unit 110 executing the operation programs.

Figure 2:
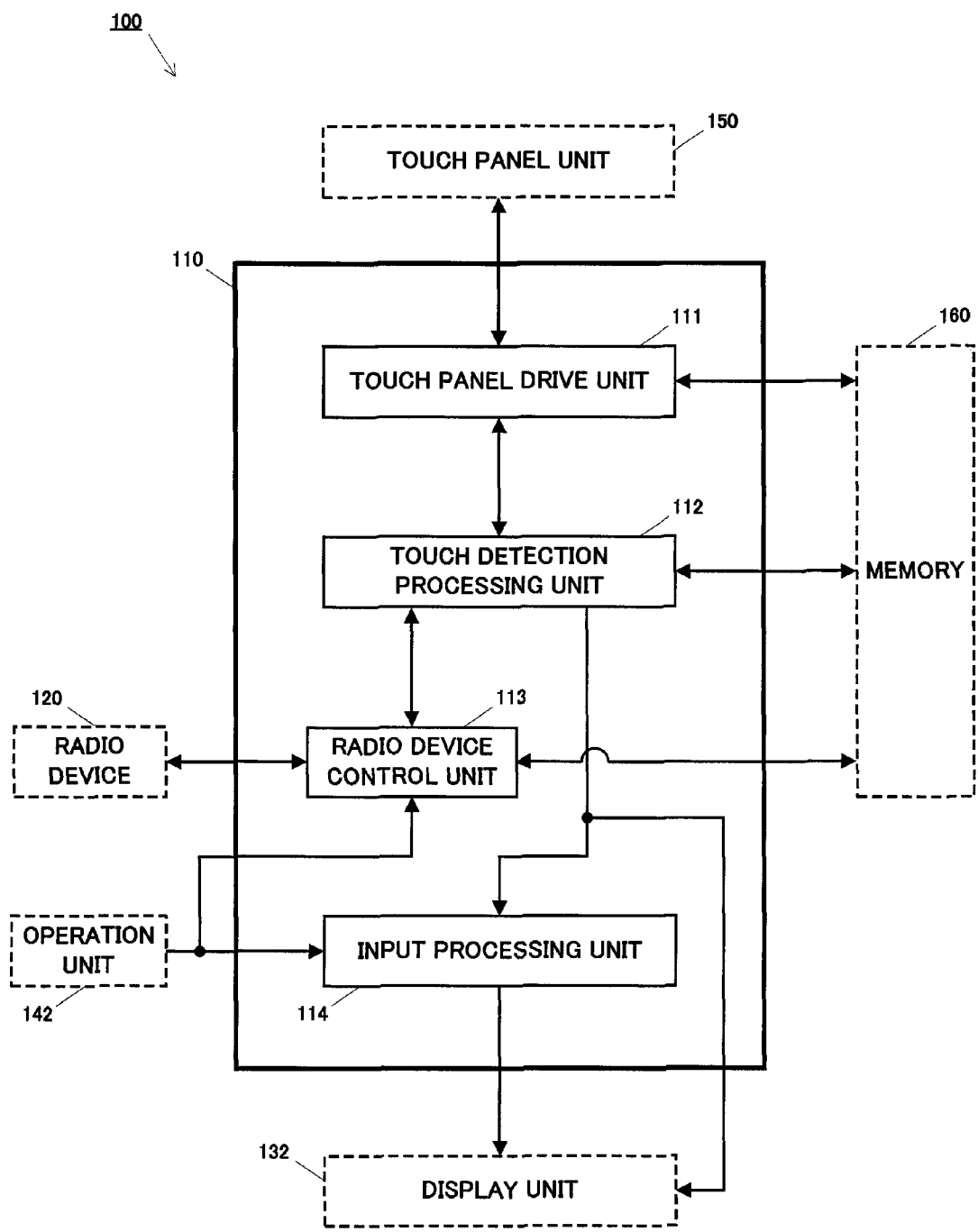
FIG. 2 is a functional block diagram showing the functional configuration realized by the control unit shown in FIG. 1.

Executing the operation programs stored in the memory 160, the control unit 110 functions as the components as shown in FIG. 2. As shown in the figure, the control unit 110 functions as a touch panel drive unit 111, a touch detection processing unit 112, a radio device control unit 113, an input processing unit 114, and so on.

The touch panel drive unit 111 drives the touch panel unit 150 to execute operations necessary for detecting the finger touch to the touch panel unit 150. Here, the touch panel drive unit 111 scans the touch sensor of the touch panel unit 150 and acquires signals indicating the capacitance from the touch panel unit 150. In this embodiment, the cycle of scanning the touch sensor (which is termed "touch detection frequency" hereafter) is variable. The touch panel unit 150 is driven at a touch detection frequency selected by the touch panel drive unit 111.

The touch detection processing unit 112 determines whether there is any finger touch to the touch panel unit 150 based on the capacitance signals the touch panel drive unit 111 has acquired from the touch panel unit 150. When there is a finger touch, calculation is made to identify the position of the finger touch (position on the coordinates of the display unit 132). Here, comparison is made between the detection signal intensities of multiple electrodes indicating any change in the capacitance and their thresholds to determine whether or not there is finger touch and the weighted average of the detection signal intensities is calculated to identify the position of the finger touch.

The radio device control unit 113 controls the radio device 120 based on input signals from the operation unit 142 to start/end a desired radio communication or broadcast reception or select a channel (switch the frequency), thereby realizing various radio transmission/reception functions of the mobile communication terminal 100.

The input processing unit 114 conducts various operations according to the input contents, such as transition of display screens of the display unit 132, based on input signals from the operation unit 142 and the touch position calculated by the touch detection processing unit 112.

In this embodiment, the above functional components are logically realized by the control unit 110. However, they can physically be realized by dedicated circuits such as ASICs (application specific integrated circuits). Particularly, the function of the touch detection processing unit 112 can be realized by an IC circuit driving the touch sensor of the touch panel unit 150. The thresholds, conditions, computing process necessary for calculating the positions can be stored in a memory element contained in such an IC circuit.

The above-described components of the mobile communication terminal 100 are essential components for realizing the present invention. Other components necessary for basic functions of a mobile communication terminal and components necessary for various additional functions are provided as necessary.

The operation of the mobile communication terminal 100 having the above-described configuration is described hereafter. Here, the touch panel unit 150 is used for input to the mobile communication terminal 100.

Techniques for preventing interference of the frequency of radio transmission/reception of the radio device 120 with the touch detection frequency so as to reduce touch detection errors during input operations in response to the finger touch to the touch panel unit 150 will be described. In the following embodiments, "touch input processes" executed by the control unit 110 for reducing touch detection errors will be described.

(Embodiment 1)

Figure 3:
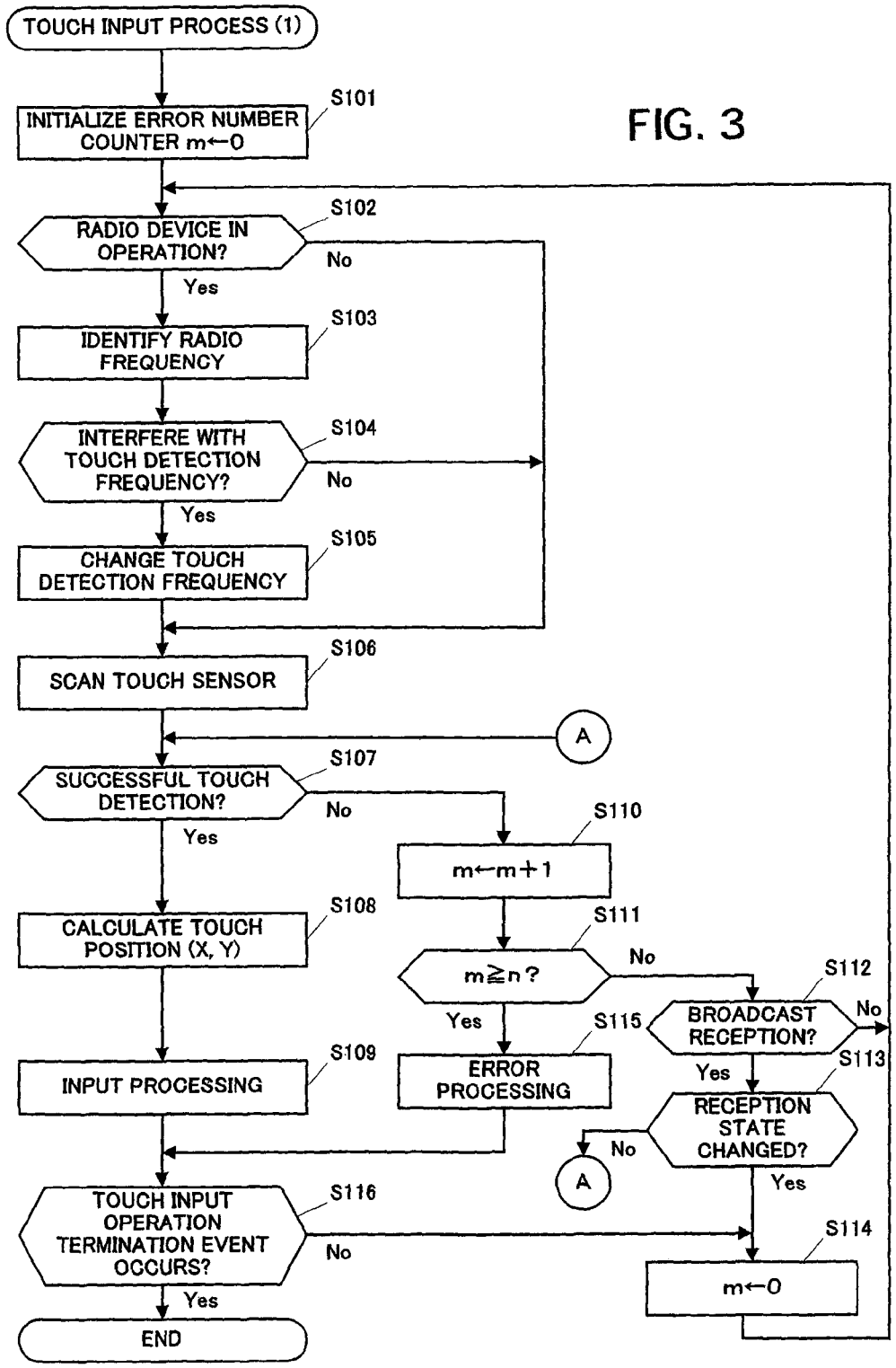
FIG. 3 is a flowchart for explaining "Touch input process (1)" according to Embodiment 1 of the present invention.

The "touch input process (1)" according to this embodiment is described with reference to the flowchart in FIG. 3. The "touch input process (1)" starts when a screen display corresponding to touch input through the touch panel unit 150 appears.

After the process starts, first, the touch detection processing unit 112 initializes an error number counter m for counting the number of touch detection errors (Step S101). Here, it is initialized to an initial value "0."

Here, the touch detection processing unit 112 inquires of the radio device control unit 113 about the operation state of the radio device 120 and determines whether the radio device 120 is in operation (Step S102).

When the radio device 120 is in operation (Step S102: Yes), in other words when the cellular module is conducting cellular communication (voice telephone call or data communication) or when the broadcast reception module is receiving digital broadcast, the touch detection processing unit 112 inquires of the radio device control unit 113 about the frequency (radio frequency) used in the radio transmission/reception and identifies the radio frequency (Step S103).

The touch detection processing unit 112 determines whether the frequency used in the radio transmission/reception of the radio device 120 currently in operation interferes with the touch detection frequency of the touch panel unit 150 (Step S104). Here, the touch detection processing unit 112 inquires of the touch panel drive unit 111 about the current touch detection frequency, identifies the touch detection frequency, and determines whether there is interference with the radio frequency.

Here, the touch detection frequency is a scanning frequency (cycle) for detecting any touch to the touch panel unit 150. When the touch detection frequency is not equal to 1/n (wherein n is an integer) of the communication or broadcast reception frequency, noise is superimposed differently in each scan and stable touch detection may not be available. In this embodiment, such a situation is referred to as "frequency interference." In Step S104, a determination is made as to whether the current touch detection frequency is equal to 1/n of the radio frequency identified in Step S103, thereby determining whether interference will occur.

When it is determined that the radio frequency interferes with the touch detection frequency (Step S104: Yes), the touch detection processing unit 112 instructs the touch panel drive unit 111 to change the touch detection frequency to a frequency with which the radio frequency does not interfere. Here, the current touch detection frequency is changed to a frequency that is 1/n of the radio frequency (Step S105). In response to an instruction from the touch detection processing unit 112, the touch panel drive unit 111 changes the current touch detection frequency to a frequency that is 1/n of the radio frequency.

With the above operation, touch detection frequency is not interfered with by the frequency of radio transmission/reception currently executed by the radio device 120, thereby reducing possible touch detection errors. In this case, the touch panel drive unit 111 starts scanning the touch sensor at the changed touch detection frequency.

When the touch sensor of the touch panel unit 150 (namely the display screen of the display unit 132) is touched by a finger or the like, change in the capacitance of the electrode at the touched position is detected. In other words, signals indicating the detected intensities are supplied from the electrodes to the touch panel drive unit 111 in each scan and the signals from the touched electrodes indicate higher intensities than those from the untouched electrodes.

A threshold for determining whether the detected intensity is caused by a finger touch is prepared. When the detected intensity indicating capacitance change is higher than the threshold, the touch detection processing unit 112 assumes that a touch has occurred and affirms successful touch detection. When the detected intensity does not meet the threshold, it is assumed that the capacitance change is caused by other factors and no touch is detected (Step S107).

For successful touch detection (Step S107: Yes), the touch detection processing unit 112 calculates the weighted average of multiple electrode positions (coordinates) where the capacitance change is detected to obtain the touch position (X, Y) (Step S108) and notifies the input processing unit 114 of it.

The input processing unit 114 executes input processing such as screen transition according to the touch to the notified touch position (Step S109).

On the other hand, when the detected intensities from the electrodes do not meet the threshold and, therefore, successful touch detection is not assumed (Step S107: No), the touch detection processing unit 112 declares a touch detection error. In such a case, the touch detection processing unit 112 increases the error number counter m by +1 to count the number of errors (Step S110).

The touch detection processing unit 112 determines whether the current counter value m is greater than n, a current set upper limit of the number of errors (Step S111).

If the number of errors is less than the upper limit n (Step S111: No), the touch detection processing unit 112 determines whether the radio transmission/reception operation by the radio device 120 is broadcast reception by the broadcast reception module or communication by the cellular communication module (Step S112).

Communication such as cellular communication and broadcast reception such as digital broadcast reception are different in characteristics. In the case of cellular communication, frequency bands are classified, for example, in the form of band classes and the operation frequency band is not often changed. The communication operation itself occurs sporadically for a relatively short time. On the other hand, in the case of broadcast reception, the user switches to a desired channel and the reception frequency may change in a short time. Conversely, if the channel is not switched, reception operation at the same frequency may continue for a relatively long time. In this embodiment, detection errors with the touch panel unit 150 are treated differently based on the above differences in characteristics so as to more efficiently reduce errors.

When it is found to be cellular communication in Step S112 (Step S112: No), the touch detection processing unit 112 performs the procedures in Step S102 and subsequent steps. This is because the touch detection frequency is set to a frequency that is not interfered by the frequency used in the cellular communication in which the frequency band is not often changed (Step S105) and, therefore, touch detection errors most likely occur due to factors other than interference of the frequency used in the communication.

Here, although the communication frequency band is not often changed, the frequency band may be switched because of moving into a different area. In such a case, the touch detection frequency is changed to a frequency with which the switched frequency does not interfere in the procedures in Steps S103 to S105. In such a case, the touch detection is highly likely successful in Step S107.

On the other hand, when it is found to be broadcast reception in Step S112 (Step S112: Yes), the touch detection processing unit 112 further determines whether the reception state is changed by switching the channel (Step S113). When the channel is switched, the reception frequency identified in Step S103 may be different from the reception frequency at the start of scanning in Step S106. Therefore, even if the touch detection frequency was changed in Step S105, the current reception frequency may interfere with it. Then, when the broadcast reception state is changed (Step S113: Yes), since the touch detection may be successful after the reception channel is stabilized, the touch detection processing unit 112 clears the error number counter m to a counter value "0" (Step S114) and performs the procedures in Step S102 and subsequent steps.

When the reception state is not changed in the broadcast reception (Step S113: No), the touch detection errors most likely occur due to factors other than interference of the frequency used in the communication as in the above-described case of communication. In such a case, presumably, the same program is continuously received and, therefore, the procedures in Step S107 and subsequent steps are performed without changing the touch detection frequency according to the reception frequency.

Here, for example, when touch detection errors occur due to factors other than the transmission/reception frequency of the radio device 120 such as failure of the touch panel unit 150, repeating the procedures in Step S102 and subsequent steps or the procedures in Step S107 and subsequent steps leads to the same errors. In such a case, the error number counter m is increased and reaches the upper limit value n (Step S111: Yes). In such a case, the touch detection processing unit 112 performs a given error procedure (Step S115). Here, the touch detection processing unit 112 instructs the display unit 132 to display an error message indicating normal touch detection failure. Such an operation allows the user to easily recognize that touch detection errors occur due to other factors.

After the above-described procedures, a determination is made as to whether any touch input operation termination event such as transition to a screen to which the touch input is not assigned and power-off of the mobile communication terminal 100 occurs (Step S116). If no termination event occurs (Step S116: No), the touch detection processing unit 112 initializes the error number counter m to a value "0" (Step S114) and repeats the procedures in the Step S102 and subsequent steps.

Then, if a termination event occurs (Step S116: Yes), the process ends.

With the above-described process, touch detection errors due to interference of the frequency used by the radio device 120 with the touch detection frequency can be reduced.

(Embodiment 2)

Figure 4:
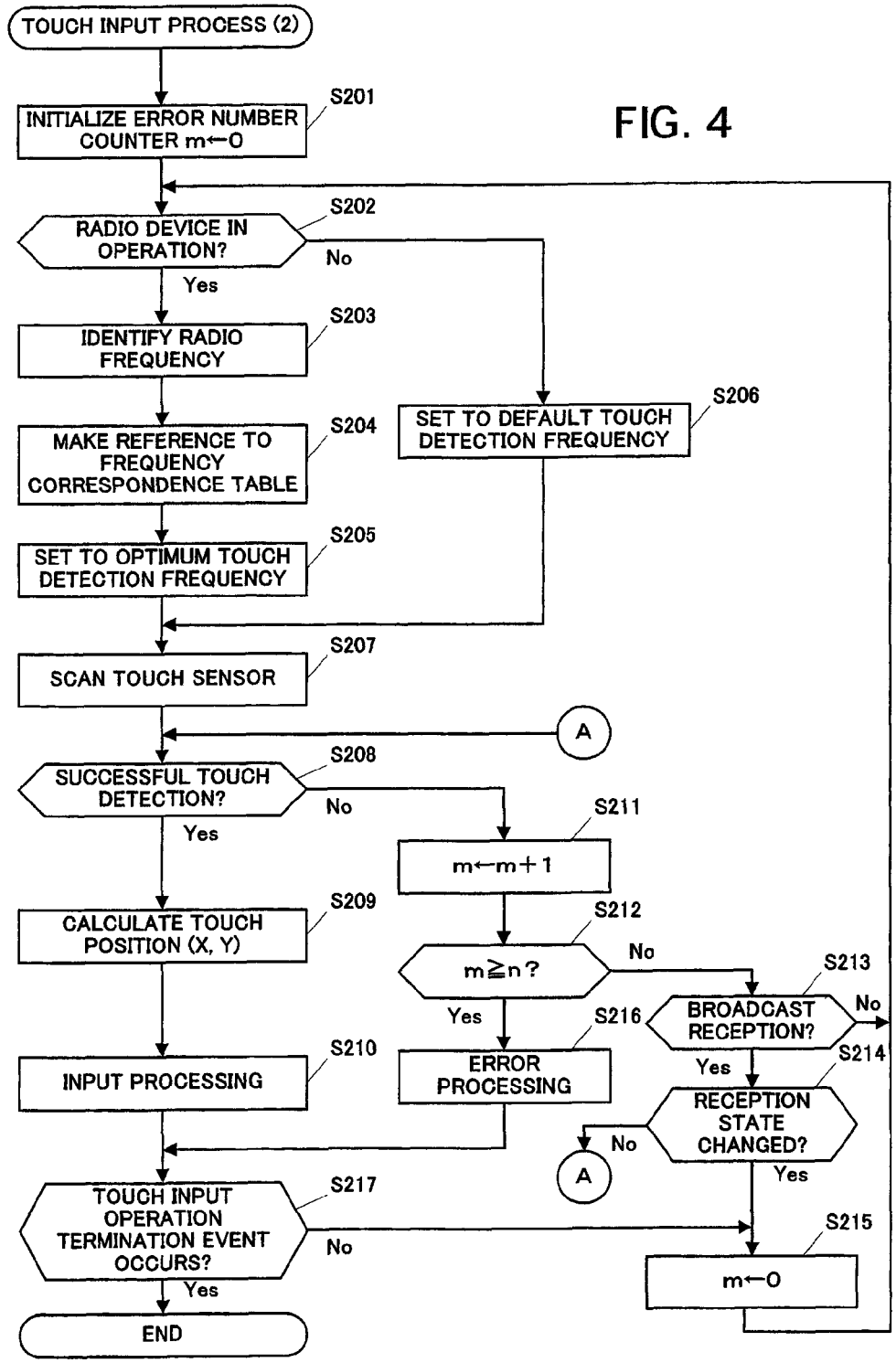
FIG. 4 is a flowchart for explaining "Touch input process (2)" according to Embodiment 2 of the present invention.

"Touch input process (2)," a modification of the "touch input process (1)" in Embodiment 1, will be described with reference to the flowchart in FIG. 4. The process start is triggered in the same manner as in the "touch input process (1)."

After the process starts, as in the "touch input process (1)," the touch detection processing unit 112 initializes the error number counter m to "0" (Step S201) and determines whether the radio device 120 is in operation (Step S202).

When the radio device 120 is in operation (Step S202: Yes), the touch detection processing unit 112 inquires of the radio device control unit 113 about the radio frequency of the radio transmission/reception and identifies the radio frequency (Step S203).

After identifying the radio frequency, the touch detection processing unit 112 accesses the memory 160 and makes reference to a frequency correspondence table stored in the memory 160 (Step S204). An example of the frequency correspondence table will be described with reference to FIG. 5.

FIG. 5A shows a "communication frequency correspondence table" to which reference is made when the radio transmission/reception operation of the radio device 120 is communication such as cellular communication. FIG. 5B shows a "broadcast frequency correspondence table" to which reference is made in the case of broadcast reception such as digital broadcast reception.

In the "communication frequency correspondence table" (FIG. 5A), as shown in the figure, information indicating frequency bands available for the mobile communication terminal 100 such as communication modes and band classes is associated with touch detection frequencies that are not interfered when those frequency bands are used as "optimum touch detection frequencies."

In the "broadcast frequency correspondence table" (FIG. 5B), as shown in the figure, information indicating channels (reception channels) selectable by the broadcast reception module of the radio device 120 is associated with touch detection frequencies that are not interfered when those channels (frequencies) are used as "optimum touch detection frequencies."

In other words, a frequency correspondence table that associates a supposable radio frequency with an optimum touch detection frequency obtained, for example, from experiments is stored in the memory 160 in advance. In Step S204, reference is made to the "communication frequency correspondence table" (FIG. 5A) or to the "broadcast frequency correspondence table" (FIG. 5B) depending on the radio transmission/reception operation at the time.

Here, the optimum touch detection frequency is determined in experiments on the operation of the radio device 120 at each supposable radio frequency (band class or reception channel) and the operation of the touch panel unit 150 at multiple prepared touch detection frequencies. Depending on influence of interference, for example, the touch detection frequencies are rated "excellent," "good," "acceptable," "unacceptable," etc. The touch detection frequencies rated "good" or higher are determined to be the optimum detection frequencies. Desirably, the rating has a margin to accommodate variations in the results due to environmental change such as temperature change.

Here, for example, if there is a touch detection frequency rated "good" or higher for multiple radio frequencies (band classes or reception channels), in other words if there is a touch detection frequency that is not interfered by a relatively wide range of radio frequencies, such a touch detection frequency is recorded in the frequency correspondence tables as the default frequency.

The touch detection processing unit 112 makes reference to the frequency correspondence tables, identifies the optimum detection frequency associated with the radio frequency identified in Step S203, and instructs the touch panel drive unit 111 to scan the touch panel unit 150 at the identified optimum touch detection frequency (Step S205).

On the other hand, when the radio device 120 is not in operation (Step S202: No), the touch detection processing unit 112 instructs the touch panel drive unit 111 to scan the touch panel unit 150 at the default touch detection frequency set in the frequency correspondence tables (Step S206).

When the touch detection frequency is changed as described above, the same procedures as in Steps S106 to S116 of the touch input process (1) (FIG. 3) are performed (Steps S207 to S217).

In this embodiment, a frequency correspondence table giving touch detection frequencies that are not interfered by the frequencies used by the radio device 120 is prepared in advance, whereby the touch detection frequency can quickly be changed without calculating a touch detection frequency according to the radio frequency.

(Embodiment 3)

The above embodiment utilizes the association between the frequency used by the radio device 120 and the touch detection frequency to reduce touch detection errors. The display frequency of the display unit 132 in which the touch panel unit 150 is configured sometimes affects the touch detection. In this embodiment, a technique for reducing touch detection errors in consideration of the display frequency will be described.

Figure 6:
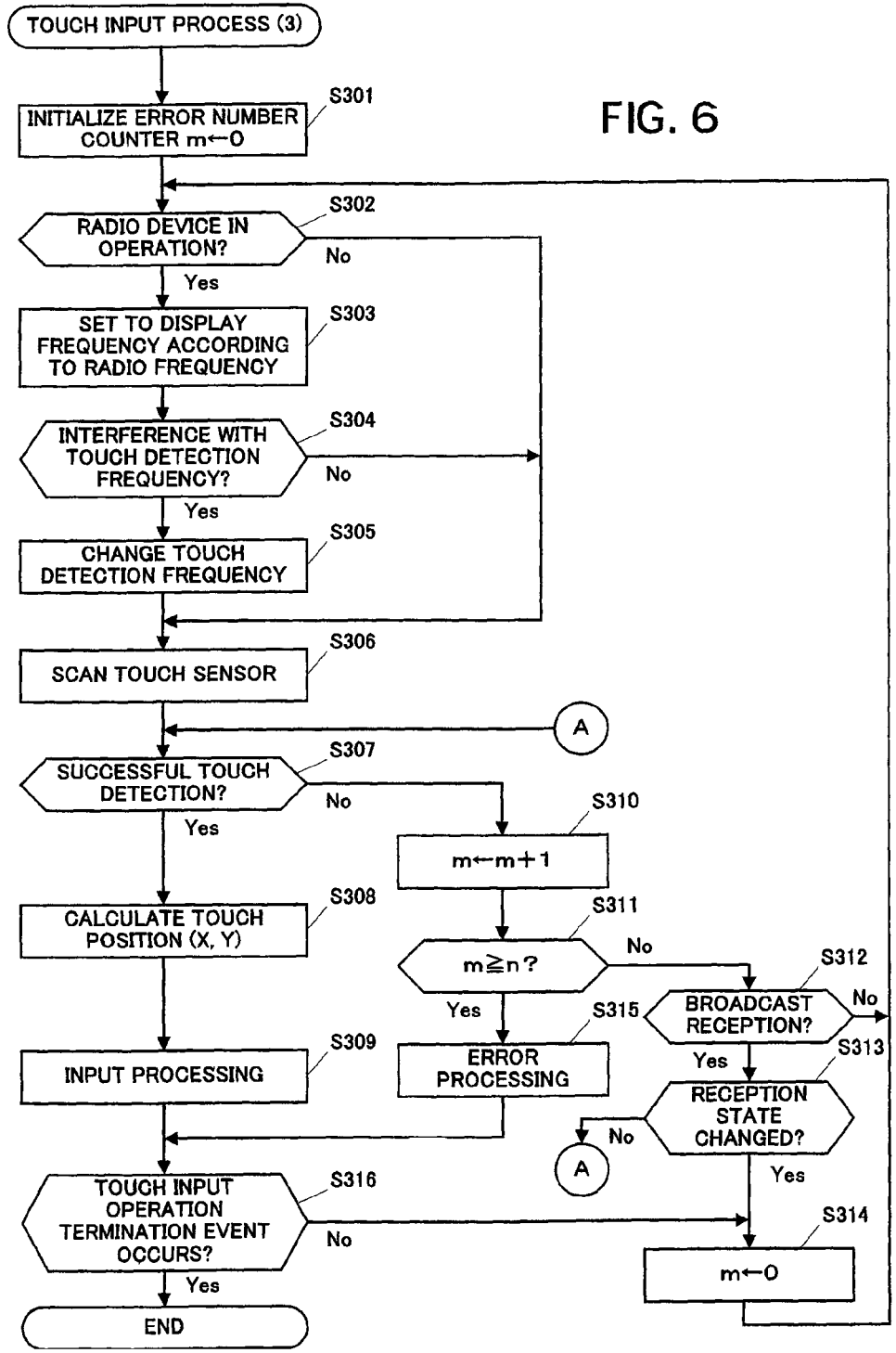
FIG. 6 is a flowchart for explaining "Touch input process (3)" according to Embodiment 3 of the present invention.

"Touch input process (3)" according to this embodiment will be described with reference to the flowchart in FIG. 6. The process start is triggered in the same manner as the above-described "touch input process (1)" and "touch input process (2)."

After the process starts, as in the "touch input process (1)" and "touch input process (2)," the touch detection processing unit 112 initializes the error number counter m to "0" (Step S301) and determines whether the radio device 120 is in operation (Step S302).

When the radio device 120 is in operation (Step S302: Yes), since the display frequency of the display unit 132 sometimes interferes with the radio frequency of the radio device 120, the touch detection processing unit 112 identifies the radio frequency used in radio transmission/reception by the radio device 120 and instructs the display unit 132 to display at a display frequency that does not interfere with the identified radio frequency (Step S303).

For identifying a display frequency according to the radio frequency, for example, frequency correspondence tables as shown in FIGS. 7A and 7B are stored in the memory 170 in advance. Making reference to these frequency correspondence tables, a display frequency at which the harmonic wave of the display clock does not interfere with the radio transmission/reception is identified. In this case, FIG. 7A shows a "communication frequency correspondence table" to which reference is made when the radio transmission/reception operation of the radio device 120 is communication such as cellular communication. FIG. 7B shows a "broadcast frequency correspondence table" to which reference is made in the case of broadcast reception such as digital broadcast reception.

The "communication frequency correspondence table" (FIG. 7A) associates, as shown in the figure, information indicating frequency bands available for the mobile communication terminal 100 such as communication modes and band classes with display frequencies at which the harmonic wave of the display clock of the display unit 132 does not interfere with those frequency bands.

The "broadcast frequency correspondence table" (FIG. 7B) associates, as shown in the figure, information indicating channels (reception channels) selectable by the broadcast reception module of the radio device 120 with display frequencies at which the harmonic wave of the display clock of the display unit 132 does not interfere with reception at those channels (frequencies).

The touch detection processing unit 112 makes reference to such frequency correspondence tables and instructs the display unit 132 to display at a display frequency that does not interfere with the radio transmission/reception by the radio device 120. Here, when a display frequency that does not interfere with the radio transmission/reception frequency can be calculated, the display frequency can be calculated without using the frequency correspondence tables.

After the display frequency of the display operation of the display unit 132 is changed, the touch detection processing unit 112 determines whether the changed display frequency interferes with the touch detection frequency for scanning the touch panel unit 150 (Step S304) and, when it interferes (Step S304: Yes), instructs the touch panel drive unit 111 to control the touch panel unit 150 at a touch detection frequency that is not interfered by the display frequency, whereby the touch detection frequency is changed (Step S305).

Whether or not the display frequency interferes with the touch detection frequency can be determined, for example, by making reference to the frequency correspondence tables as shown in FIGS. 7A and 7B. In other words, the frequency correspondence tables shown in FIGS. 7A and 7B by way of example associate the frequencies of radio transmission/reception by the radio device 120 with display frequencies that do not interfere with them and further associate those display frequencies with touch detection frequencies that are not interfered by them. If the current touch detection frequency is not the one associated with the changed display frequency, it is changed to the associated touch detection frequency (optimum touch detection frequency).

The optimum touch detection frequencies in this case are also determined by experiments. Here, unlike the above Embodiment 2, the touch detection frequency that is not interfered is determined based on both the association between the radio frequency and display frequency and the association between the display frequency and touch detection frequency in this embodiment. Therefore, the touch detection frequency is selected in a more subdivided range. The optimum touch detection frequency is identified based on only the association between the radio frequency and touch detection frequency in the above Embodiment 2. Then, even though a touch detection frequency that does not interfere with the radio frequency is identified, the touch detection frequency that is not interfered by the radio frequency may interfere with a display frequency that is selected as not interfering with the radio frequency. This embodiment will prevent such a phenomenon.

When the display frequency that does not interfere with the frequency of radio transmission/reception of the radio device 120 can be calculated, for example, a display frequency correspondence table as shown in FIG. 7C can be stored in the memory 160 in advance. The display frequency correspondence table associates, as shown in the figure, display frequencies that can be set by the display unit 132 with optimum touch detection frequencies for those display frequencies. Making reference to such a table when the display frequency is changed, a touch detection frequency that is not interfered can be found.

After the touch detection frequency is changed as described above, the same procedures in Steps S106 to S116 of the "touch input process (1)" (FIG. 3) are performed (Steps S306 to S316).

This embodiment optimizes the touch detection frequency in additional consideration of the display frequency of the display unit 132, thereby more efficiently reducing touch detection errors.

In such a case, a touch detection frequency that does not easily cause touch detection errors can quickly be determined by storing a table associating the radio frequency and display frequency that do not interfere with each other and a table associating the display frequency and touch detection frequency that do not interfere with each other in the memory 160 in advance.

As described above, with the present invention being applied as in the above embodiments, touch detection errors due to influence of the frequency used by the radio device or the display frequency of the display unit can be reduced. In other words, reliable, highly stable touch detection is realized regardless of change in the frequency of the radio device or display unit.

The above embodiments are given by way of example and the present invention is not restricted to them. The present invention has various applications and includes any forms of implementation.

The memory 170 can store a frequency correspondence table associating radio frequencies with touch detection frequencies that interfere with the radio frequencies in advance. Then, the touch detection processing unit 112 makes reference to the frequency correspondence table and instructs the touch panel drive unit 111 to scan the touch panel unit 150 at any frequency that is not the identified touch detection frequency with which the radio frequency interferes.

For example, in the above embodiments, the present invention is applied to a mobile communication terminal as an electronic device. The electronic device is not restricted thereto. The present invention can be applied to any electronic device as long as it has a touch panel input function.

Furthermore, in the above embodiments, the touch panel is a capacitive touch panel. The present invention can be applied to other types of touch panels of which the detection accuracy is affected by noise in relation to screen display so as to reduce the number of retry operations upon error.

In the above embodiments, the touch panel is configured on the display screen of the display unit. The touch panel and display unit are not necessarily integrated. In other words, even if the touch panel and display unit are separated, touch detection errors easily occur when the display frequency of the display unit interferes with the touch detection frequency of the touch panel. In such a case, the present invention can be applied to reduce touch detection errors.

The electronic device of the present invention can be realized not only by an electronic device provided with a configuration regarding the present invention in advance but also by applying programs to a computer controlling an electronic device using a touch panel. In other words, the same programs as those executed by the control unit 110 described in the above embodiments are applied to an existing electronic device and the computer of the device executes the programs to realize the same functions as the control unit 110, whereby the device functions as the electronic device of the present invention.

Such programs can be applied in any means. For example, the programs are stored in a memory medium such as a CD-ROM and memory card, or applied via a communication medium such as Internet.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An electronic device comprising a radio device and a touch panel, comprising:
  a radio frequency identifying unit that identifies a radio frequency used by said radio device;
  an operation frequency identifying unit that identifies an operation frequency of said touch panel that does not interfere with at least the radio frequency identified by said radio frequency identifying unit;
  a touch panel drive unit that drives said touch panel at the operation frequency identified by said operation frequency identifying unit;
  a display unit having a switchable display frequency;
  a display frequency identifying unit that identifies a display frequency for said display unit that does not interfere with the radio frequency identified by said radio frequency identifying unit; and
  a display control unit that operates said display unit and switches the switchable display frequency of the display unit to the display frequency identified by said display frequency identifying unit,
  wherein said radio frequency identifying unit is configured to re-identify a radio frequency used by said radio device when the radio frequency used by said radio device is a frequency for digital broadcast and a reception state for receiving the digital broadcast is changed, and
  wherein said operation frequency identifying unit identifies said operation frequency as a frequency that does not interfere with the display frequency identified by said display frequency identifying unit.

2. The electronic device according to claim 1, further comprising:
  an interference determination unit that determines whether or not an interference exists where the radio frequency identified by said radio frequency identifying unit interferes with an operation frequency in use by said touch panel,
  wherein said operation frequency identifying unit operates to identify the operation frequency of said touch panel that does not interfere with the radio frequency when said interference determination unit affirms said interference.

3. The electronic device according to claim 1, further comprising:
  an interference determination unit that determines whether or not an interference exists where the display frequency identified by said display frequency identifying unit interferes with an operation frequency in use by said touch panel,
  wherein said operation frequency identifying unit operates to identify the operation frequency of said touch panel that does not interfere with the display frequency when said interference determination unit affirms said interference.

4. The electronic device according to claim 1, further, comprising:
  a correspondence information memory that stores correspondence information associating radio frequency information indicating multiple radio frequencies with operation frequency information indicating said operation frequencies that do not interfere with the radio frequencies indicated by the radio frequency information,
  wherein said operation frequency identifying unit identifies said operation frequency based on said correspondence information.

5. The electronic device according to claim 4, wherein said correspondence information memory stores said correspondence information that associates display frequency information indicating multiple display frequencies with said radio frequency information and/or said operation frequency information.

6. The electronic device according to claim 1, wherein said operation frequency identifying unit identifies said operation frequency that is an integral multiple of the radio frequency identified by said radio frequency identifying unit and does not interfere with the radio frequency.

7. The electronic device according to claim 1, further comprising:
  an error determination unit that determines whether or not any touch detection error occurs when said touch panel drive unit drives said touch panel at an operation frequency identified by said operation frequency identification unit; and
  an error processing unit that processes errors when said error determination unit determines that any touch detection error has occurred.

8. The electronic device according to claim 7, wherein:
  said radio device performs multiple types of radio transmission/reception, and
  said error processing unit performs different error procedures according to the type of radio transmission/reception performed by said radio device.

9. A non-transitory computer-readable storage medium having recorded therein programs that allow a computer, which controls an electronic device including a radio device, a touch panel, and a display unit with a switchable display frequency, to realize the following functions:
  identifying a radio frequency used by said radio device;
  identifying an operation frequency of said touch panel that does not interfere with at least the identified radio frequency;
  driving said touch panel at the identified operation frequency;
  identifying a display frequency for said display unit that does not interfere with the identified radio frequency;
  switching the switchable display frequency of said display unit to the identified display frequency that does not interfere with the identified radio frequency; and
  re-identifying the radio frequency used by said radio device when the radio frequency used by said radio device is a frequency for digital broadcast and a reception state for receiving the digital broadcast is changed,
  wherein the operation frequency of said touch panel is identified in such a manner as not to interfere with either of the identified radio frequency or the identified display frequency.

* * * * *